US011676068B1

(12) United States Patent
Zimmer et al.

(10) Patent No.: US 11,676,068 B1
(45) Date of Patent: Jun. 13, 2023

(54) METHOD, PRODUCT, AND APPARATUS FOR A MACHINE LEARNING PROCESS LEVERAGING INPUT SPARSITY ON A PIXEL BY PIXEL BASIS

(71) Applicant: Cadence Design Systems, Inc., San Jose, CA (US)

(72) Inventors: Michael Patrick Zimmer, Chicago, IL (US); Ngai Ngai William Hung, San Jose, CA (US); Yong Liu, Cupertino, CA (US); Dhiraj Goswami, Wilsonville, OR (US)

(73) Assignee: Cadence Design Systems, Inc., San Jose, CA (US)

( * ) Notice: Subject to any disclaimer, the term of this patent is extended or adjusted under 35 U.S.C. 154(b) by 165 days.

(21) Appl. No.: 16/946,673

(22) Filed: Jun. 30, 2020

(51) Int. Cl.
*G06N 20/00* (2019.01)
*G06F 17/16* (2006.01)

(52) U.S. Cl.
CPC ............. *G06N 20/00* (2019.01); *G06F 17/16* (2013.01)

(58) Field of Classification Search
CPC .................................................... G06N 20/00
See application file for complete search history.

(56) References Cited

U.S. PATENT DOCUMENTS

| 5,267,185 A | 11/1993 | Akabane et al. |
| 7,945,528 B2 | 5/2011 | Cytron et al. |
| 9,128,697 B1 | 9/2015 | Potter et al. |
| 9,330,167 B1 | 5/2016 | Pendar |
| 10,643,705 B2 | 5/2020 | Choi et al. |
| 10,817,260 B1 | 10/2020 | Huang et al. |
| 2010/0306300 A1 | 12/2010 | Lu et al. |
| 2016/0342890 A1 | 11/2016 | Young |
| 2018/0165574 A1 | 6/2018 | Young et al. |
| 2018/0307968 A1 | 10/2018 | Bose et al. |
| 2018/0314671 A1 | 11/2018 | Zhang et al. |
| 2019/0012296 A1 | 1/2019 | Hsieh et al. |
| 2019/0042237 A1 | 2/2019 | Azizi et al. |

(Continued)

OTHER PUBLICATIONS

Ankur6ue. (Jul. 30, 2018). Understanding Matrix Multiplication on a Weight-Stationary Systolic Architecture. Retrieved from TELESENS: http://www.telesens.co/2018/07/30/systolic-architectures/.

(Continued)

*Primary Examiner* — Joseph D Torres
(74) *Attorney, Agent, or Firm* — Vista IP Law Group, LLP

(57) ABSTRACT

An approach includes a method, product, and apparatus for dynamically removing sparse data on a pixel by pixel basis. In some embodiments, a machine learning processing job is received. The machine learning processing job is then executed on a pixel by pixel basis by selecting non-zero data values for input into a systolic array, wherein sparse data is not selected for input into the systolic array. Subsequently, a message is generated that provides an indication of whether the execution completed successfully. In some embodiments, the machine learning processing job comprises at least a plurality of multiply and accumulate operations. In some embodiments, at least one data value equal to zero for the machine learning processing job is not input into a systolic array. In some embodiments, a plurality of weights are input into a plurality of columns for each cycle.

27 Claims, 11 Drawing Sheets

(56) References Cited

U.S. PATENT DOCUMENTS

| | | |
|---|---|---|
| 2019/0236049 A1 | 8/2019 | Vantrease et al. |
| 2019/0244086 A1* | 8/2019 | Franca-Neto ........ G06N 3/0445 |
| 2020/0097442 A1 | 3/2020 | Jacob (Yaakov) et al. |
| 2020/0244282 A1 | 7/2020 | Bajic et al. |
| 2020/0410036 A1 | 12/2020 | Huynh et al. |
| 2021/0035258 A1 | 2/2021 | Ray et al. |
| 2021/0064992 A1 | 3/2021 | Park et al. |
| 2021/0124794 A1 | 4/2021 | Nair et al. |
| 2021/0157767 A1 | 5/2021 | Ross et al. |
| 2021/0256360 A1 | 8/2021 | Nam |
| 2021/0271451 A1 | 9/2021 | Nair et al. |
| 2021/0303909 A1 | 9/2021 | Gunnam et al. |
| 2021/0326686 A1 | 10/2021 | Abdelaziz et al. |
| 2021/0377122 A1 | 12/2021 | Pennello |
| 2022/0076066 A1 | 3/2022 | Forgeat et al. |
| 2022/0129521 A1 | 4/2022 | Surti et al. |

OTHER PUBLICATIONS

Brownlee, J. (Jul. 23, 2018). When to Use MLP, CNN, and RNN Neural Networks. Retrieved from Machine Learning Mastery: https://machinelearningmastery.com/when-to-use-mlp-cnn-and-rnn-neural-networks/.

So, G. (Mar. 28, 2019). Should We Abandon LSTM for CNN? Retrieved from Medium: https://medium.com/ai-ml-at-symantec/should-we-abandon-lstm-for-cnn-83accaeb93d6.

Non-Final Office Action for U.S. Appl. No. 16/946,675 dated Jun. 17, 2022.

Non-Final Office Action for U.S. Appl. No. 16/946,672 dated Jun. 8, 2022.

Non-Final Office Action for U.S. Appl. No. 16/946,671 dated Mar. 2, 2022.

Yin et al., "Parana: A Parallel Neural Architecture Considering Thermal Problem of 3D Stacked Memory", IEEE Transactions on Parallel and Distributed Systems, vol. 30, No. 1, Jan. 2019, pp. 146-160.

Ahmad, S., et al., "Xilinx First 7nm Device: Versal AI Core (VC1902)," Xilinx Inc, dated Aug. 20, 2019.

Prieto, R., "Implementation of an 8-bit Dynamic Fixed-Point Convolutional Neural Network for Human Sign Language Recognition on a Xilinx FPGA Board," Department of Electrical and Information Technology Lund University, dated Mar. 17, 2019.

Jawandhiya, P., "Hardware Design for Machine Learning," International Journal of Artificial Intelligence and Applications (IJAIA), vol. 9, No. 1, dated Jan. 2018.

"Dell EMC Ready Solutions for AI—Deep Learning with Intel," Measuring performance and capability of deep learning use cases, Dell EMC, dated Jun. 2019.

Mayannavar, S., et al., "Hardware Accelerators for Neural Processing," International Journal of Computer Information Systems and Industrial Management Applications, ISSN 2150-7988 vol. 11 (2019) pp. 046-054, dated Apr. 17, 2019.

Kung et al., "Adaptive Tiling: Applying Fixed-size Systolic Arrays To Sparse Convolutional Neural Networks", 2018 24th International Conference on Pattern Recognition (ICPR) Beijing, China, (Aug. 20-24, 2018).

Final Office Action dated Sep. 1, 2022 for U.S. Appl. No. 16/946,671.

Shao, "Lab 2: Systolic Arrays and Dataflows", UC Berkeley, Feb. 10, 2020, pp. 1-15. Retrieved from the Internet < URL: https://inst.eecs.berkeley.edu/~ee290-2/sp20/ >.

GitHub, "Gemmini—Berkeley's Systolic Array Generator", Apr. 26, 2020, 7 pages. Retrieved from the Internet < URL: https://web.archive.org/web/20200426231646/https://github.com/ucb-bar/gemmini >.

Su et al., "A Comparison of Single-Buffer and Double-Buffer Design in a Systolic Array Generator", Journal of Physics: Conference Series 1693, Nov. 9, 2020, pp. 1-6.

Non-Final Office Action dated Oct. 3, 2022 for U.S. Appl. No. 16/946,674.

Notice of Allowance dated Nov. 1, 2022 for U.S. Appl. No. 16/946,675.

Non-Final Office Action for U.S. Appl. No. 16/946,670 dated Nov. 9, 2022.

Notice of Allowance for U.S. Appl. No. 16/946,672 dated Jan. 9, 2023.

Notice of Allowance for U.S. Appl. No. 16/946,674 dated Feb. 2, 2023.

Yin et al., "A High Energy Efficient Reconfigurable Hybrid Neural Network Processor for Deep Learning Applications", Dec. 2017, pp. 968-982 (Year: 2017).

* cited by examiner

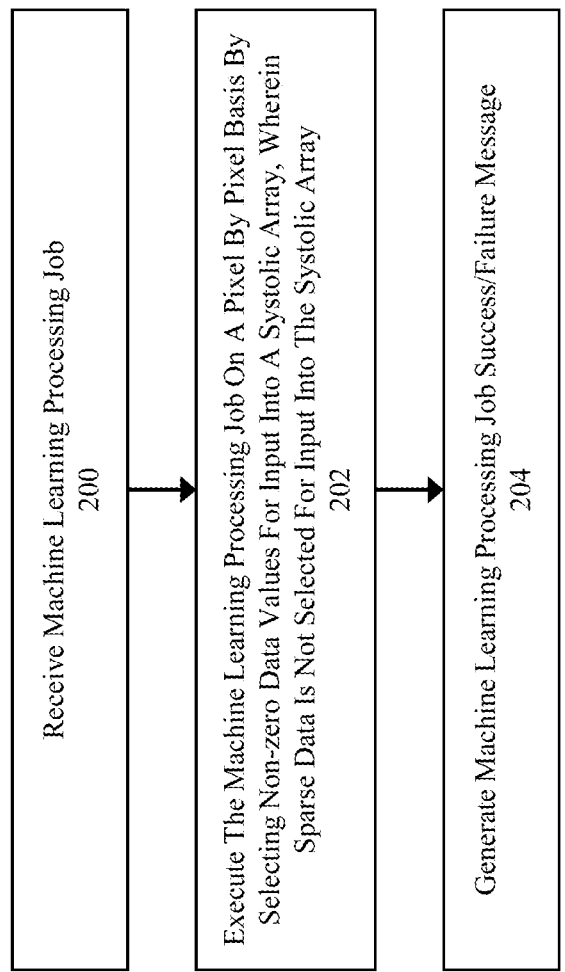

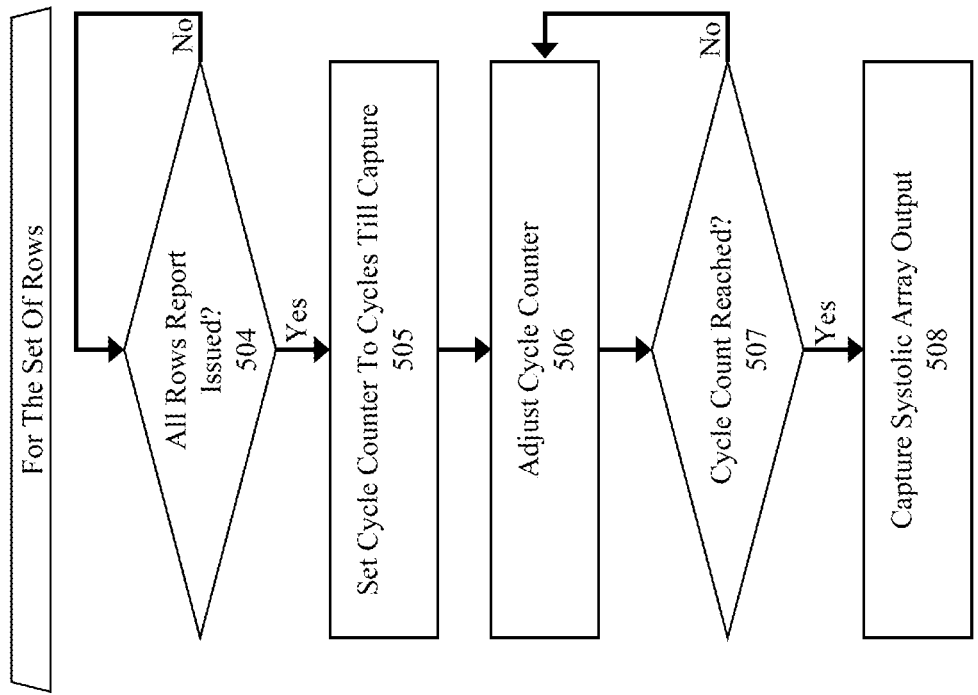
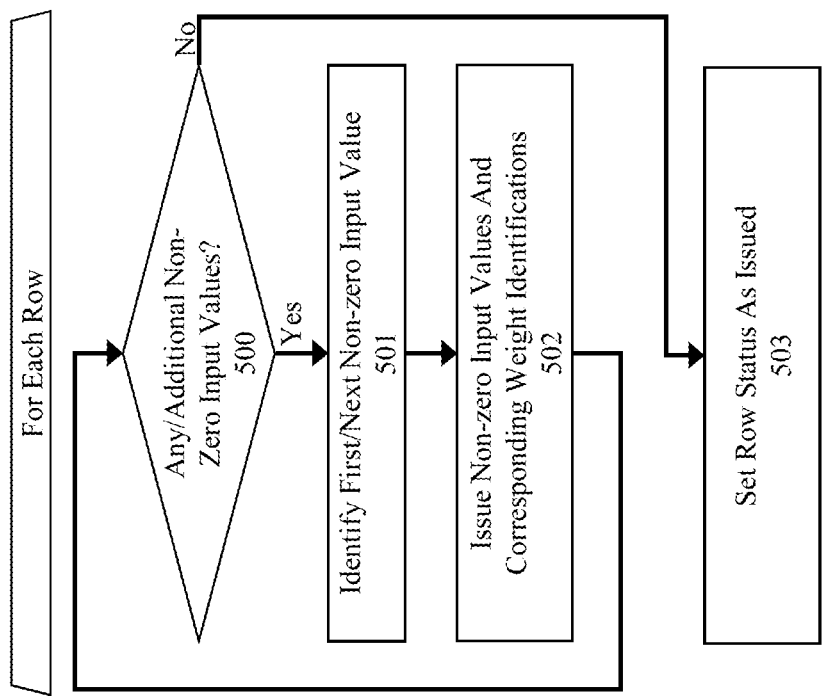
FIG. 5A

FIG. 6A

Bank 1
601a

| | CHANNEL | | | | | | |
|---|---|---|---|---|---|---|---|
| | 1 | 2 | 3 | 4 | 5 | ... | m |
| Pixel 1 | p1c1 | p1c2 | p1c3 | p1c4 | p1c5 | | p1cm |
| Pixel 2 | p2c1 | p2c2 | p2c3 | p2c4 | p2c5 | | p2cm |
| Pixel 3 | p3c1 | p3c2 | p3c3 | p3c4 | p3c5 | | p3cm |
| Pixel 4 | p4c1 | p4c2 | p4c3 | p4c4 | p4c5 | | p4cm |
| Pixel 5 | p5c1 | p5c2 | p5c3 | p5c4 | p5c5 | | p5cm |
| ... | | | | | | | |
| Pixel n | pnc1 | pnc2 | pnc3 | pnc4 | pnc5 | | pncm |

⋮

Bank k
601k

| | CHANNEL | | | | | |
|---|---|---|---|---|---|---|
| | c1 = km+1 | c2 = km+2 | c3 = km+3 | c4 = km+4 | c5 = km+5 | ... | cm = km+m |
| Pixel 1 | p1c1 | p1c2 | p1c3 | p1c4 | p1c5 | | p1cm |
| Pixel 2 | p2c1 | p2c2 | p2c3 | p2c4 | p2c5 | | p2cm |
| Pixel 3 | p3c1 | p3c2 | p3c3 | p3c4 | p3c5 | | p3cm |
| Pixel 4 | p4c1 | p4c2 | p4c3 | p4c4 | p4c5 | | p4cm |
| Pixel 5 | p5c1 | p5c2 | p5c3 | p5c4 | p5c5 | | p5cm |
| ... | | | | | | | |
| Pixel n | pnc1 | pnc2 | pnc3 | pnc4 | pnc5 | | pncm |

FIG. 6B

Bank 1
602a

| | CHANNEL | | | | | | |
|---|---|---|---|---|---|---|---|
| | 1 | 2 | 3 | 4 | 5 | ... | m |
| Pixel 1 | p1c1 | p1c2 | p1c3 | p1c4 | p1c5 | | p1cm |
| Pixel 2 | p2c1 | p2c2 | p2c3 | p2c4 | p2c5 | | p2cm |
| Pixel 3 | p3c1 | p3c2 | p3c3 | p3c4 | p3c5 | | p3cm |
| Pixel 4 | p4c1 | p4c2 | p4c3 | p4c4 | p4c5 | | p4cm |

Bank 2
602b

| | CHANNEL | | | | | | |
|---|---|---|---|---|---|---|---|
| | 1 | 2 | 3 | 4 | 5 | ... | m |
| Pixel 5 | p5c1 | p5c2 | p5c3 | p5c4 | p5c5 | | p5cm |
| Pixel 6 | p6c1 | p6c2 | p6c3 | p6c4 | p6c5 | | p6cm |
| Pixel 7 | p7c1 | p7c2 | p7c3 | p7c4 | p7c5 | | p7cm |
| Pixel 8 | p8c1 | p8c2 | p8c3 | p8c4 | p8c5 | | p8cm |

US 11,676,068 B1

METHOD, PRODUCT, AND APPARATUS FOR A MACHINE LEARNING PROCESS LEVERAGING INPUT SPARSITY ON A PIXEL BY PIXEL BASIS

RELATED APPLICATIONS

The present application is related to co-pending U.S. patent application Ser. No. 16/946,674 titled "METHOD, PRODUCT, AND APPARATUS FOR A MULTIDIMENSIONAL PROCESSING ARRAY FOR HARDWARE ACCELERATION OF CONVOLUTIONAL NEURAL NETWORK INFERENCE", U.S. patent application Ser. No. 16/946,675 titled "METHOD, PRODUCT, AND APPARATUS FOR VARIABLE PRECISION WEIGHT MANAGEMENT FOR NEURAL NETWORKS", now issued as U.S. Pat. No. 11,615,320, U.S. patent application Ser. No. 16/946,672 titled "METHOD, PRODUCT, AND APPARATUS FOR A MACHINE LEARNING PROCESS USING DYNAMIC REARRANGEMENT OF SPARSE DATA AND CORRESPONDING WEIGHTS", U.S. patent application Ser. No. 16/946,671 titled "METHOD, PRODUCT, AND APPARATUS FOR A MACHINE LEARNING PROCESS USING A SYSTOLIC ARRAY WITH MULTIMODAL WEIGHT MANAGEMENT", U.S. patent application Ser. No. 16/946,670 titled "METHOD, PRODUCT, AND APPARATUS FOR A MACHINE LEARNING PROCESS USING WEIGHT SHARING WITHIN A SYSTOLIC ARRAY HAVING REDUCED MEMORY BANDWIDTH" filed on even date herewith, which are hereby incorporated by reference in their entirety.

FIELD

This disclosure pertains to determining inferences using convolutional neural networks.

BACKGROUND

The increase of the computing capacity of computing devices and the interconnection of those devices has enabled multiple uses for artificial intelligence. For instance, artificial intelligence can now be found in digital personal assistants and various informational websites. Additionally, artificial intelligence has seen substantial use in image processing fields, such as in recognition of objects (e.g., an AI system in a car recognizing a pedestrian) and other types of image processing.

Various types of techniques have been employed to implement AI and machine learning. For example, one particularly dominant approach to AI is the processing of data using neural networks such as those used in deep learning techniques. Neural networks generally comprise a logical collection of logical nodes connected to other nodes by one or more weighted connections. These logical nodes are arranged in logical layers where each node is associated with the performance of the same type of operations and a plurality of nodes are provided in each convolution layer. For instance, one common type of operation used for convolutional neural networks are multiply accumulate operations.

However, the data matrix for these operations is often sparse where a significant amount of input values are equal to zero. The values in the data matrix are sent to the systolic array for processing regardless of the fact that these multiplication by zero operations and accumulations have no effect of the results output from the systolic array. This is essentially wasted effort. Furthermore, activation functions used in machine learning operations often result in the creation of values equal to zero, which in turn may result in more operations that are essentially wasted effort.

Thus, what is needed is an improved method, product, and apparatus for decreasing the amount of wasted operations executed for machine learning processing.

SUMMARY

Embodiments of the present invention provide an approach for a method, product, and apparatus for a machine learning process leveraging input sparsity on a pixel by pixel basis.

This approach includes a method, product, and apparatus for dynamically removing sparse data on a pixel by pixel basis. In some embodiments, a machine learning processing job is received. The machine learning processing job is then executed on a pixel by pixel basis by selecting non-zero data values for input into a systolic array, wherein sparse data is not selected for input into the systolic array. Subsequently, a message is generated that provides an indication of whether the execution completed successfully. In some embodiments, the machine learning processing job comprises at least a plurality of multiply and accumulate operations. In some embodiments, at least one data value equal to zero for the machine learning processing job is not input into a systolic array. In some embodiments, a plurality of weights are input into a plurality of columns for each cycle. In some embodiments, a specific arrangement of data for executing the machine learning processing job is provided to maintain at least data for processing that corresponds to how memory is accessed.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

FIG. 2 illustrates a flow for processing machine learning jobs leveraging input sparsity on a pixel by pixel basis according to some embodiments.

FIG. 5A illustrates a second example process flow corresponding to the block titled execute processing to complete multiply accumulate operations by at least controlling the input of pixel/activated data into a systolic array and the selection of corresponding weights at processing elements of the systolic, wherein at least one pixel/activated data value equal to zero is not input into the systolic array illustrated in FIG. 3 according to some embodiments.

FIGS. 6A-B illustrate example memory arrangements according to some embodiments.

DETAILED DESCRIPTION

Embodiments of the present invention provide an approach for a method, product, and apparatus for a machine learning process leveraging input sparsity on a pixel by pixel basis.

The approach disclosed herein and described in at least FIG. 1A. below may avoid some of the operations to multiply and accumulate sparse data. Additionally, while the embodiments and approach included herein is discussed in the context of images having pixels and a specific row and column arrangement, the approach included herein can be used on any data, regardless of whether the data is actually/from an image, and whether that data actually comprises pixels. Instead, the approach described herein can be used on any data that can be or is similarly arranged. Additionally, the row and column references herein are used for ease of understanding and because of convention. However, the approach herein can also be applied to structures that have swapped row/column relationships and for processing where data may propagated in any other direction.

Figure 1A:
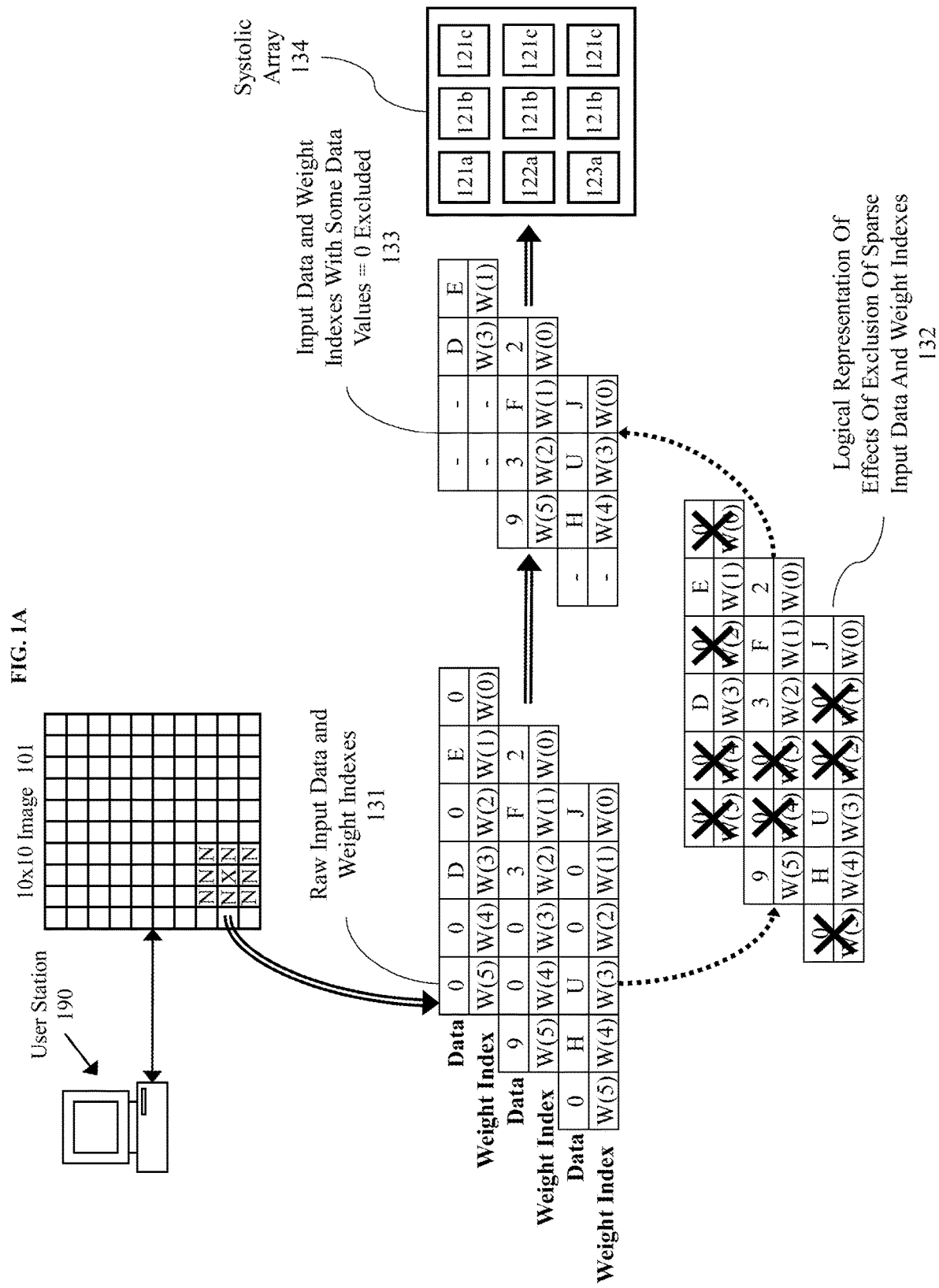
FIG. 1A depicts an example flow of an approach for a machine learning process leveraging input sparsity on a pixel by pixel basis according to some embodiments.

FIG. 1A depicts an example flow of an approach for a machine learning process leveraging input sparsity on a pixel by pixel basis according to some embodiments. Generally, the approach includes identification of data values equal to zero and removal of those data values to the extent that the number of data inputs into a row of a systolic array can be balanced for each pixel.

In some embodiments, a user station 190 provides an image to be processed using a model of a trained convolutional neural network. As illustrate, the image 101 has 10×10 pixels. An individual pixel of the image is processed pursuant to a kernel size. the illustration shows how a 3×3 kernel is processed. A pixel is identified in image 101 by "X" and neighboring pixels are identified by "N". Furthermore, the systolic array 134 has processing elements 121a-123c arranged in a 3×3 grid. Thus, there are 27 data items per output pixel with each row corresponding to 1 input channel and 3×3 data items per row. However, of these 27 data items, some number will often be equal to zero (because they were equal to zero in the original representation/image, or because they were determined to be equal to zero through processing such as after using an activation function).

Raw input data and weight indexes 131 represent the first six data items for each row. The data items that are equal to zero, or not equal to zero, can be identified as illustrated at 132 where data items equal to zero have a large X through them. As can be seen, four data values in the first row are equal to zero leaving two non-zero values, two data values in the second row are equal to zero leaving four non-zero values, and three data values in the third row are equal to zero leaving three non-zero data values.

The non-zero data values are illustrated at 133 where input data and corresponding weight indexes are shown. Additionally, some values have been replaced by values representing a stall. Logically, the data values that are equal to zero result in a multiplication by zero and then an accumulation with the result from a processing element in a row above the current row. This is essentially a useless operation as it does not contribute to the partial sum. To avoid this wasted effort, when each row has at least one data value equal to zero, processing of at least one data value equal to zero can be avoided in each row. As a result, for each pixel, a number of multiply and accumulate operations can be avoided where that number is proportional to the number of sparse data values (data values equal to zero) that are common to the rows for a given pixel.

In some embodiments, an equal number of operations is required for each row used in the systolic array. Here, the middle row to be input into 122a-c has the largest number of non-zero values and therefore is the controlling factor in the number of cycles required for processing at the systolic array—e.g., four cycles for each row plus any additional cycles required to offset the input data. Each row that has less then four non-zero data values is padded with a stall operation—e.g., the first row to be input into 121a-c has two non-zero data values and the third row to be input into 123a-c has three non-zero data values, thus the first row is padded with two operations while the third row is padded with only one, and the pixel is processed using two less cycles. When each row of input data for a corresponding pixel has at least one piece of input data equal to zero, at least one cycle of processing can be avoided for the systolic array.

In some embodiments, each piece of input data has a corresponding weight index. This weight index might be used to identify the correct weight to use for each computation in each channel which corresponds to a respective column of the systolic array. The present disclosure describes one approach for providing a corresponding weight to each processing element by loading each active processing element with a weight corresponding to the weight index and the output channel each time the location of respective pieces of input data changes within the systolic array—e.g., by selecting and loading the weight from memory for each processing element each cycle as opposed to passing weights through rows which are input only in the top row. However, additional approaches to providing the corresponding weight may be provided as disclosed in Ser. No. 16/946,671 filed on even date herewith and currently titled "METHOD, PRODUCT, AND APPARATUS FOR A MACHINE LEARNING PROCESS USING A SYSTOLIC ARRAY WITH MULTIMODAL WEIGHT MANAGE- MENT" and/or Ser. No. 16/946,670 filed on even date herewith and currently titled "METHOD, PRODUCT, AND APPARATUS FOR A MACHINE LEARNING PROCESS USING WEIGHT SHARING WITHIN A SYSTOLIC ARRAY HAVING REDUCED MEMORY BANDWIDTH".

Figure 1B:
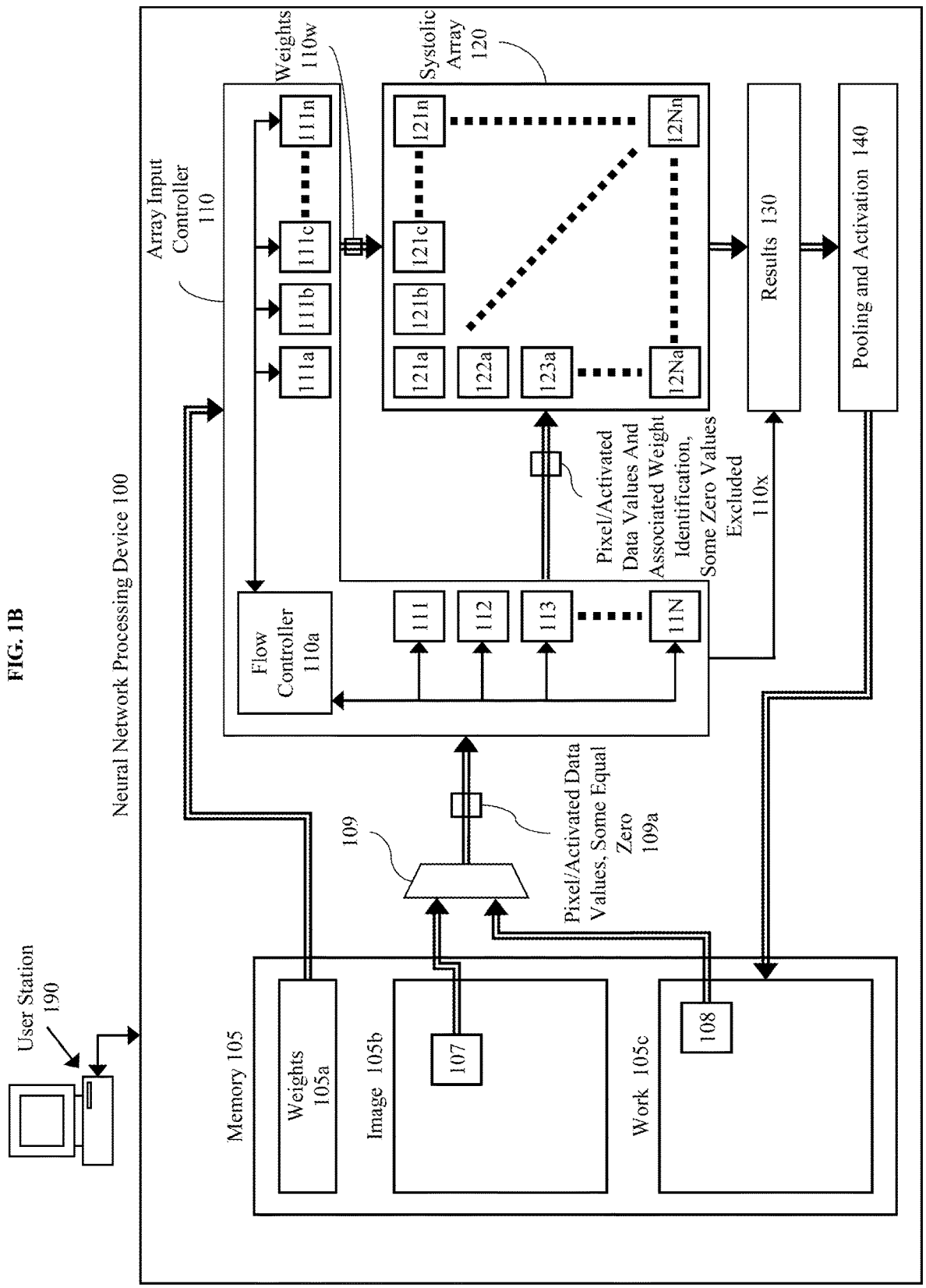
FIG. 1B depicts an example system that implements machine learning process leveraging input sparsity on a pixel by pixel basis according to some embodiments.

FIG. 1B depicts an example system that implements the machine learning process leveraging input sparsity on a pixel by pixel basis according to some embodiments. Generally, the system executes machine learning processing jobs using an approach that identifies and, in some case, removes data values equal to zero from the processing flow. In this way, the approach illustrated here saves processing cycles of a processing arrangement (e.g., a systolic array) and saves power consumption by avoiding the execution of operations that perform no useful function.

The system includes a neural network processing device 100 connected to a user station 190. In some embodiments, the neural network processing device 100 receives a machine learning processing job from a user station 190. The user station 190 comprises any type of computing station that is useable to operate or interface with a database or other computing device, such as one that might store, perhaps temporarily, or have a machine learning processing job. Examples of such user stations include workstations, personal computers, phones, tablets, or remote computing terminals. In some embodiments, the user station 190 comprises a display device, such as a display monitor, for displaying a user interface to users at the user station. In some embodiments, the user station 190 also comprises one or more input devices for the user to provide operational control over the user station, such as a mouse, keyboard, or touch screen to manipulate a graphical user interface from which a user input might be received.

The neural network processing device 100 has multiple components including a memory 105, an array input controller 110, a systolic array 120, a results unit 130, and a pooling and activation unit 140. Generally, the neural network processing device 100 executes the approach illustrated in FIG. 1A. In particular, the array load unit will identify data values by identify non-zero data values or excluding data values equal to zero, identify corresponding rows in a weight matrix, and manage the flow of processing using a systolic array.

In some embodiments, the memory 105 includes a plurality of memory segments 105a-c. In some embodiments, the segments may be provided separately or in any combination such that one or more physical resources are used for storage of the underlying information—e.g., separate physical memory devices are provided for each of the weights 105a, the image 105b, and the work 105c. In some embodiments, an image is received from user station 190 and stored in the image memory 105b. This data is then processed as will be discussed below and the results of which are then stored in the work memory 105c. In some embodiment, the image is replaced with the results such that the image and the work memory utilize the same underlying resources. In some embodiments, the image may be processed at the systolic array 120 without storing the image at 105b. In some embodiments, the memory for 105 is provided with multiple read and/or write ports. The weight memory 105 may be populated with the necessary data to execute a machine learning processing job using any relevant technique.

The array input controller 110 receives input data and corresponding weights from the memory 105. In some embodiments, an original image or the work data may be selected using a mux 109, a logically equivalent circuit, or based on memory addresses to retrieve the pixel/activated data values 109a, some of which may be equal to zero. Similarly, corresponding weights may be provided to the array input controller 110 from the weight memory 105a. The array input controller may also be used to control or provide control information and/or signals to the results unit 130 to manage the capture of the results of processing the input data against the weights at the systolic array 120. Additionally, the capture of the results at 130 may be used at 140 to trigger the pooling and/or activation of the data at 140 which may be stored in the work segment 105c.

The array input controller 110 includes a flow controller 110a and a plurality of input elements. With regard to input data, elements 111-11N received input data for a corresponding row and provide pixel/activated data values which exclude some values equal to zero at 110x. For example, for a first layer of a model for a trained convolutional neural network, pixel data for a selected pixel 107/108 and neighboring pixels, as determined by a kernel size, are provided to or retrieved by the flow controller 110a and passed to respective elements of 111-11N, these elements then select data values that are not equal to zero to provide to a corresponding row of the systolic array 120.

The array input controller 110, also identifies weights that are needed by the systolic array. For example, one approach is provided herein wherein during each cycle, each processing element of processing elements 121a-12Nn within the systolic array 120 receives a weight from memory (see weights 110w). In some embodiments, only processing elements that need a weight that is not already in the processing element is provided a weight. In some embodiments, each column is associated with a column management element (e.g., from 111a-111n) that provides the needed weight(s) to the processing elements in that column (e.g., 111a provides weights to 121a-12Na as needed). In some embodiments, the systolic array may comprise at least some processing elements that include a plurality of storage locations for storing a plurality of weights which may be selected based on a weight index corresponding to the input data.

Generally, for a machine learning processing job each data value will correspond to one or more weights which may in turn correspond to different channels. These weights are used in a systolic array (e.g., systolic array 120) for multiply and accumulate operations at processing elements (e.g., 121a-12Nn) within the array. For example, each data value is multiplied by a respective weight in each multiply accumulate operation—e.g., data value X is multiplied by a first corresponding weight and accumulated with a result from a previous multiply and accumulate operation. The result of the multiply and accumulate operation is then passed down to the next portion (e.g., corresponding processing element in the next row) in the systolic array for accumulation as part of a subsequent multiply and accumulate operation. Eventually, the accumulated results will be passed through the array and output for a next phase of the machine learning processing job—such as for processing in a subsequent convolution layer of a trained neural network. However, for a data value that is equal to zero the result of the multiplication of the data value times the weigh would be equal to zero and the accumulation would be equal to the previous result. Essentially the multiply and accumulate operation that includes a data value equal to zero passes the previous result to a next processing element within a systolic array. To address this issue, the approach disclosed herein dynamically removes sparse data (data values equal to zero) or selects non-zero values from input rows on a pixel by pixel basis while maintaining proper alignment of data with their corresponding weights, with respect to the rows for a particular pixel, and from pixel to pixel.

The systolic array 120 comprises an array of processing elements where each processing element may be connected to an edge of the systolic array and/or a neighboring processing element. For example, As illustrated, the systolic array 120 comprises 1–N rows and a-n columns where each row and column intersection corresponds to a processing element. In some embodiments, the number of rows is equal to the number of columns such that each row has the same number of processing elements as each column. Thus, the systolic array 120 includes 121a-12Nn processing elements.

The systolic array 120 receives the input data which may have some values equal to zero removed. Generally, the systolic array will receive weights along one dimension (e.g., across a column) and data along another direction (e.g., at the beginning of each row and passed through each processing element within the row). When passed through the array, the data at each processing element (e.g., 121a-12Nn) is multiplied by a received/corresponding weight and accumulated with a partial sum from a previous element, until the partial sums generated along the first dimension (the weight dimension) are output from the systolic array. In this way, each of the rows or columns in the first dimension corresponds to an output channel for the current pixel being processed.

The output of the systolic array is captured at the results accumulation unit 130. In some embodiments this comprises at least temporarily storing the results from the systolic array. In some embodiments, the results are stored in a memory (e.g., work memory 105c) for further processing. Additionally, because the array input controller operates on a pixel wise basis and because the amount of sparse data for each pixel and its neighbors will vary, the number of cycles needed to process each pixel may vary from one pixel to the next. Thus, in some embodiments, inputs from the array input controller 110 might be used to control the capture of results from the systolic array—such that the timing of the capture of these results corresponds to the maximum number of non-zero data values input into and of the second dimension of the systolic array for each respective pixel.

The pooling and activation unit 140 will execute any pooling and activation functions on the results from the systolic array. Pooling has multiple different variants that are generally directed towards combining values. For example, pooling can comprise any combination of max/average operations on a 2×2, 3×3, etc., set of data with any number of different strides. Additionally, one or more activation functions might be utilized on the data—e.g., ReLu, ReLu6, Tanh, Sigmoid, and element wise operations on the results generated by the systolic array. As a result of the execution of an activation function, many more data values might be converted to zero. Thus, as each convolutional layer is processed, the resulting activated data might contain numerous data values equal to zero. These values may then be processed in a subsequent layer of a machine learning model, which implement the processes discussed herein leveraging sparse data on a pixel by pixel basis. In some embodiments, the results from the pooling and activation unit 140 are stored in and/or read from the work memory 105c.

FIG. 2 illustrates a flow for processing machine learning jobs leveraging input sparsity on a pixel by pixel basis according to some embodiments. Generally, the process starts when a machine learning processing job is received. The machine learning processing job is then executed using a systolic array by leveraging input sparsity on a pixel by pixel basis to dynamically avoid processing of sparse data as disclosed herein. Finally, a message indicating success or failure is generated.

The process starts at 200 where a machine learning processing job is received. The machine learning processing job might be received from a user device (e.g., user station 190) either directly or indirectly. For example, the user station 190 might comprise an image or set of images for processing to perform an inference task. For instance, a previously defined neural network model might be represented by a plurality of layers having a specific configuration of weights. A processing job might comprise an image to be processed with a particular trained neural network to determine if the image is of the thing or type of thing the neural network was trained on.

At 202 the machine learning process is executed on a pixel by pixel basis by selecting non-zero data values for input into a systolic array, wherein sparse data is not selected for input into the systolic array. This will be discussed further below. Briefly, the process will identify data values that are not equal to zero for processing. Stalls will be inserted into a systolic array for each row of a respective pixel, such that each row in a set of rows for a particular pixel have the same number of entries. Subsequently, at least those entries are processed and captured. Thus, the number of cycles required for executing the machine learning processing job may be decreased by the minimum number of data values equal to zero in each row of a set of rows for a respective pixel.

At 204 a machine learning processing job success/failure message is generated. In some embodiments, the message comprises a direct indication that the processing job was completed successfully or that the processing job failed. In some embodiments, a success message is represented by a message that moves or provides the result(s) of the machine learning processing job or indicates that the results of the machine learning processing job are ready/available.

Figure 3:
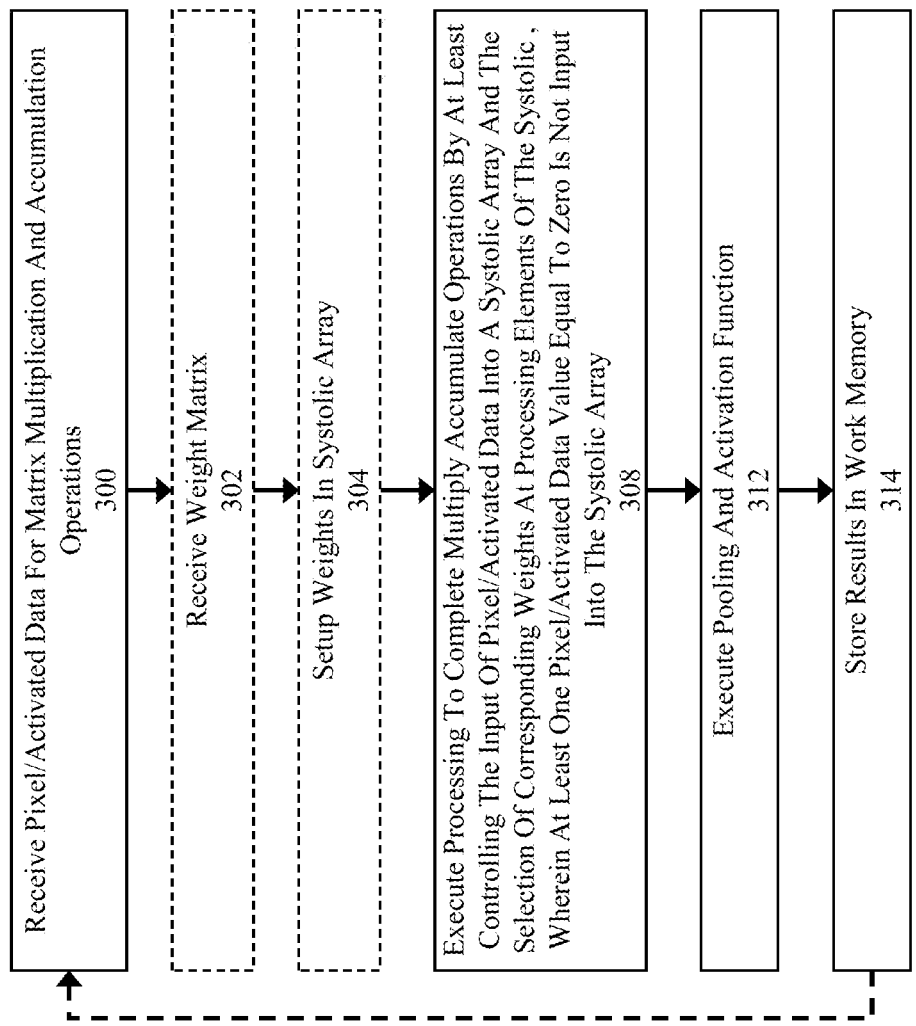
FIG. 3 illustrates an example process flow corresponding to the block titled execute machine learning process using a systolic array by leveraging input sparsity on a pixel by pixel basis to dynamically avoid processing of sparse as illustrated in FIG. 2 according to some embodiments.

FIG. 3 illustrates an example process flow corresponding to the block titled execute the machine learning processing job on a pixel by pixel basis by selecting non-zero data values for input into a systolic array, wherein sparse data is not selected for input into the systolic array as illustrated in FIG. 2 according to some embodiments. Generally, the process is implemented using a dynamic approach because the relevant information (e.g., data values) will be different for each machine learning processing job and will be different as they pass through different layers of a trained machine learning model.

At 300, pixel/activated data for matrix multiplication and accumulation operations is received. For example, the machine learning processing job might specify a location of a data matrix that is pending processing (e.g., in image memory 105b). Similarly, a weight matrix might be received at 302 where a location of a weight matrix that is associated with the pending processing is stored (e.g., in weight memory 105a).

In some embodiments, weights are setup in the systolic array at 304. For instance, a plurality of weights could be preloaded into a plurality of processing elements of the systolic array. Additionally, corresponding weight indexes could be captured to determine which stored weight to select for performing a corresponding multiply and accumulate operation at a particular processing element.

At 308, processing is executed to complete multiply accumulate operations by at least controlling the input of pixel/activated data into a systolic array and the selection of corresponding weights at processing elements of the systolic array, wherein at least one pixel/activated data value equal to zero is not input into the systolic array. As discussed previously at least in regard to FIG. 1A, this process identifies data values that are no equal to zero and inserts stalls in respective rows for a particular pixel in such a way that each row for a given pixel will have an equal number of operations. Embodiments of this process is discussed further at least in regard to FIGS. 4A-B and 5A-B.

In some embodiments, pooling and activation functions are executed at 312. As previously discussed, the pooling and activation functions might result in multiple data values equal to zero. These values may be stored in a memory at 314 before being processed again to implement a subsequent layer of a trained machine learning model.

Figure 4A:
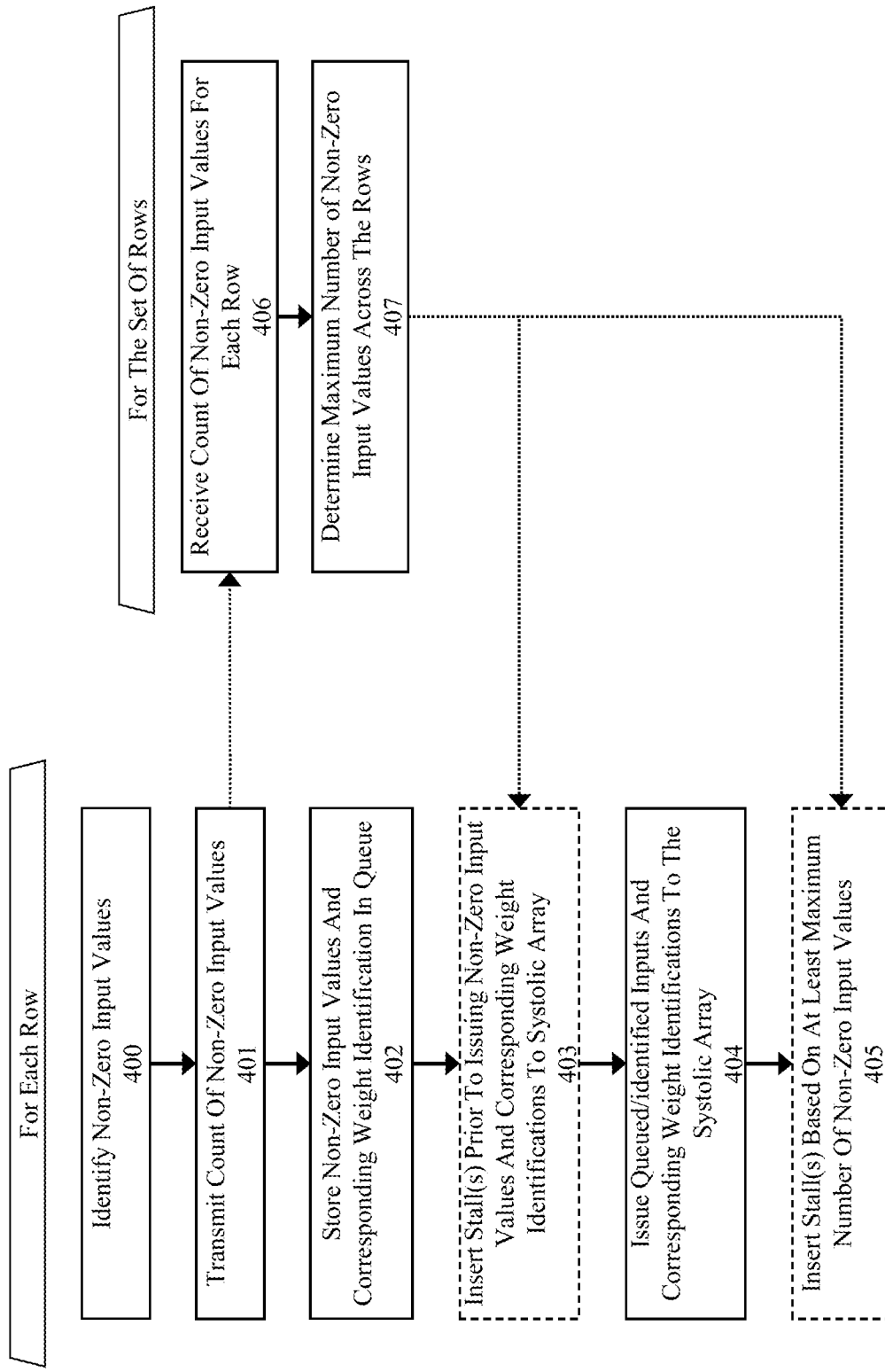
FIG. 4A illustrates a first example process flow corresponding to the block titled execute systolic array processing to complete multiply accumulate operations by at least controlling the input of pixel/activated data into a systolic array and the selection of corresponding weights at the systolic array, wherein at least one pixel/activated data value equal to zero is not input into the systolic array illustrated in FIG. 3 according to some embodiments.

FIG. 4A illustrates a first example process flow corresponding to the block titled execute systolic array processing to complete multiply accumulate operations by at least controlling the input of pixel/activated data into a systolic array and the selection of corresponding weights at the systolic array, wherein at least one pixel/activated data value equal to zero is not input into the systolic array illustrated in FIG. 3 according to some embodiments.

The approach includes a process that is completed for each row (e.g., by 111-11N) and a process that is completed for the rows as a group (e.g., by flow controller 110a). The process completed for each row comprises actions illustrated at 400-405, whereas the process completed for the set of rows comprises the actions illustrated at 406-407.

At 400, each row is analyzed to identify non-zero input values. In particular, each piece of input data that is not equal to zero is identified. As part of this, a count of non-zero data values, in full or in part, may be generated and provided to the process for the set of rows at 406. At 406 the counts of non-zero values for each row are received. These counts may be processed at 407 to identify the maximum number of non-zero input values across all the rows for a given pixel.

At 402 the non-zero input values and their corresponding weights or weight indexes (weight identification) are stored in a queue. In some embodiments, the input values and weight identification may be stored separately. For example, for each non-zero input value the data may be storage in a queue for the corresponding row and the weight identification may be stored in a queue for weights. In some embodiments, the input values are already stored in a queue or data structure, and non-zero input values are identified via a list, flag, or bit value.

In some embodiments, stalls are inserted into the corresponding queues at 403. Alternatively, stalls can be inserted on the fly as data values are passed into the systolic array as disclosed at 405. In either case, the number of stalls to be inserted is determined based on the maximum number of non-zero data values identified as received from 407 and the number of non-zero data values in the respective row under analysis. Thus, for each row, stalls are used to pad any rows that do not include the maximum number of non-zero input values.

Regardless of whether stalls are input into the queue (at 403) or into the systolic array (at 405) as needed, the process will issue any queued/identified inputs and corresponding weight identification to the systolic array as would normally occur—e.g., by staggering the first value for each row of a set of input data for a given pixel, omitting data values equal to zero, and inserting stalls as needed to maintain alignment.

Figure 4B:
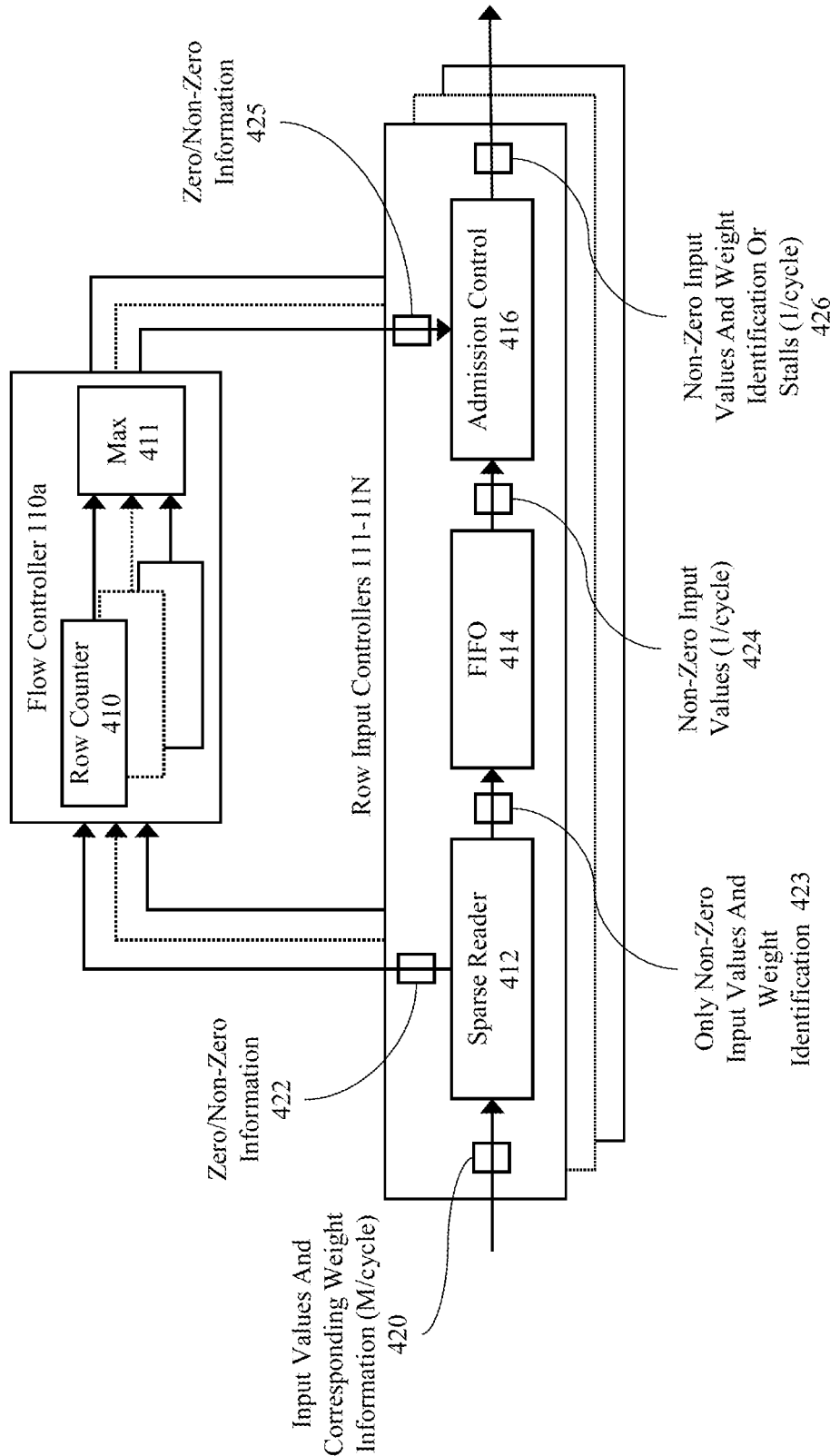
FIG. 4B illustrates a first example system corresponding to the block titled execute processing to complete multiply accumulate operations by at least controlling the input of pixel/activated data into a systolic array and the selection of corresponding weights at processing elements of the systolic, wherein at least one pixel/activated data value equal to zero is not input into the systolic array illustrated in FIG. 3 according to some embodiments.

FIG. 4B illustrates a first example system corresponding to the block titled execute processing to complete multiply accumulate operations by at least controlling the input of pixel/activated data into a systolic array and the selection of corresponding weights at processing elements of the systolic, wherein at least one pixel/activated data value equal to zero is not input into the systolic array illustrated in FIG. 3 according to some embodiments.

The example system includes a flow controller 110a and a plurality of row input controllers 111-11N as previously discussed. However, FIG. 4B includes additional elements for/in these elements according to some embodiments.

In some embodiments, each row controller will include a sparse reader (e.g., 412), a first in first out (FIFO) structure (e.g., 414), and an admission control element (e.g., 416). In some embodiments, the flow controller 110a includes a one or more row counters (410) and an element to identify/maintain the max value from the one or more row counters 410.

In some embodiments, input values and corresponding weight information 420 is received at a respective row input controller. In some embodiments, a single data item is received each cycle that element is then analyzed by the sparse reader 412 to determine if it is a non-zero value. In some embodiments, some multiple (M) of data items are received at 412 where the sparse reader determines which data items are not equal to zero. At 422 non-zero information is provided to the flow controller 110a which may be stored in, or used to increment, a corresponding row counter (e.g., 410). For example, a strobed signal could be used to indicate a number of non-zero values such as by a number of strobes, an integer value could be used to specify the number of non-zero data values. Regardless, the information is provided from the sparse reader 412 to the flow controller and into a corresponding row counter (e.g., 410).

In some embodiments, the FIFO 414 receives only the non-zero data inputs and weigh identifications 423 which are passed through by the sparse reader 412. In some embodiments, the FIFO 414 can accept and store up to some number (e.g., M) data inputs and corresponding weigh information (e.g., weight index) each cycle. In this way, the sparse reader can work together to capture one or a multiple of non-zero data values in a single cycle. However, while the input side may accept multiple data items in a single cycle, the FIFO will issue only a single data value at 424.

The admission control unit 416 will received non-zero information 425. And non-zero input values 424 over a given cycle. In some embodiments, the admission control unit uses the non-zero information 425 to determine when non-zero data values within the FIFO have been exhausted for a particular pixel being processed. Additionally, the Admission controller 416 will insert a number of stalls—e.g., based on a determination that the FIFO has no remaining non-zero data values for the particular pixel being processed, Specifically, a respective row of data for a given pixel might have 14 non-zero data items stored in the corresponding FIFO. However, for the group of row input controllers 111-11N a row for the given pixel with the largest number of non-zero data items might have 24 non-zero data items. In this example, the row input controller with 14 non-zero data items would need an additional 10 operations to have the same corresponding number of operations. In some embodiments the admission control unit 416 might issue one of the 14 non-zero data items (see e.g., 426), and subsequently insert 10 stall operations for that row and pixel.

In some embodiments, the flow controller 110 has one or more row counters (see 410). The row counter 410 or multiple thereof is used to count the number of non-zero input values for each respective row for a given pixel. The values of this/these row counters are then input into 411 where a determination is made as to which value is the maximum of those received/computed. The max identified at 411 is then passed to respective admission control units 416. In some embodiments, respective row counters could be passed to corresponding row input controllers to use for determining when the respective FIFO's are empty and when the admission control units should switch to outputting stalls. In this way each row can be used to transmit the same numbers of operations per row for a given pixel into a systolic array on a pixel by pixel basis.

In some embodiments, instead of tracking numbers of non-zero values, numbers of values equal to zero can be tracked and used to determine how many stalls should be inserted at each row—e.g., the count that represents the smallest number of values equal to zero can be used to decrease the count for each row of the number of values equal to zero to arrive at the number of stalls that need to be inserted at each respective row to maintain balance between the rows. In some embodiments, the row counter(s) are reset for each new set of data being received for a new pixel. In some embodiments, multiple counters for each row could be used to allow for processing of data for different pixels with no, or a limited number, of idle cycles for respective processing elements—e.g., pipelining. In some embodiments, the max determined at 411 is used to determine when to capture the output of a systolic array or respective outputs of the systolic array (e.g., at 130 described above).

FIG. 5A illustrates a second example process flow corresponding to the block titled execute processing to complete multiply accumulate operations by at least controlling the input of pixel/activated data into a systolic array and the selection of corresponding weights at processing elements of the systolic, wherein at least one pixel/activated data value equal to zero is not input into the systolic array illustrated in FIG. 3 according to some embodiments.

Similar to the flow illustrated above in FIG. 4A, the approach illustrated in FIG. 5A also has a set of actions that are implemented for each row, and a set of actions for the set of rows as a group. The actions for each row are represented at 500-503, and the actions for group of rows are represented at 504-508.

At 500, a determination is made as to whether there are any/additional non-zero input values remaining to be issued for processing. If there are no further values to be issued, the process proceeds to 503 where a status for the row is set to issued. Once a row reports its status as issued, that row will issue stalls until the process is complete for the pixel or the row beings to issue non-zero input values for a different pixel. However, if there are any non-zero values that have not yet been issued the process proceeds to identification of a non-zero input values (at 501) and issuance of that value at 502 before the flow returns to 500.

At 504, the process for the group of rows monitors the set by repeatedly determining whether all rows have reported a status of issued. For example, each clock cycle a monitoring process makes determination as to whether all rows report the status issued. While none or only a portion of the rows report a status of issued the process will return to 504 to make the same determination again.

Once all the rows report an issued status, a cycle counter is set at 505 to control when the results of processing the data for a respective pixel should be captured. That counter is then adjusted each cycle at 506 until a cycle count has been reached as determined at 507. At which point systolic array output data is captured at 508.

Figure 5B:
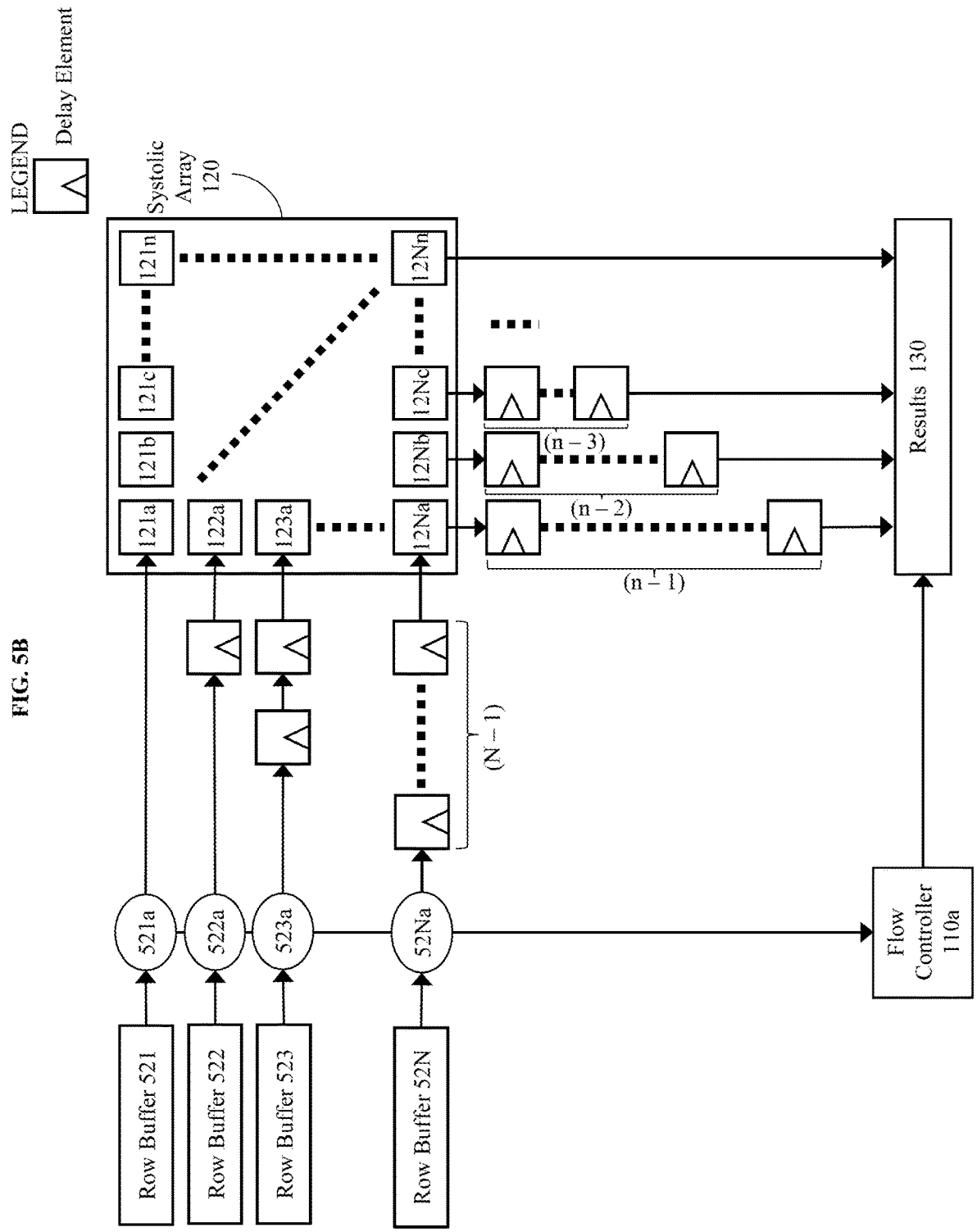
FIG. 5B illustrates a second example system corresponding to the block titled execute processing to complete multiply accumulate operations by at least controlling the input of pixel/activated data into a systolic array and the selection of corresponding weights at processing elements of the systolic, wherein at least one pixel/activated data value equal to zero is not input into the systolic array illustrated in FIG. 3 according to some embodiments.

FIG. 5B illustrates a second example system corresponding to the block titled execute processing to complete multiply accumulate operations by at least controlling the input of pixel/activated data into a systolic array and the selection of corresponding weights at processing elements of the systolic, wherein at least one pixel/activated data value equal to zero is not input into the systolic array illustrated in FIG. 3 according to some embodiments.

The system includes a plurality of row buffers 521-52N a plurality of issuing elements 521a-52Na coupled to a flow controller 110a. In some embodiments, each row will have a varying number of delay elements (e.g., flip flop elements). For example, each row will have N−1 delay elements where N is the row number. Thus, the first row will have zero delay elements, the second will have one delay element, the third element will have 2 delay elements, and so on. This simplifies the issuing process such that each row may issue data during the same cycle(s) with the delay elements offsetting the input of those data items into the systolic array 120 to maintain alignment. Additionally, the capture of outputs from the systolic array 120 are also offset by n−1 delay elements. However, whereas the first row has no delay elements, and each subsequent row has a first/additional delay element, the first column has the most delay elements n−1 and the subsequent column has one fewer (n−2) elements and each subsequent column has one less delay element.

The row buffers 521-52N include at least non-zero data values. In some embodiments, the row buffers might be populated by a sparse reader like sparse reader 412. In some embodiments, the issuing elements 521a-52Na will identify and issue individual non-zero data items each cycle for their corresponding row buffer. Once all non-zero data values have been issued by a respective issuing element, that respective issuing element will issue stalls into the systolic array or a delay element until the flow controller 110a triggers the processing for a new pixel.

Results are captured at 130. Because both the inputs and the outputs have an increasing and decreasing number of delay elements for the inputs and the outputs all the outputs can be captured during the same cycle. This simplifies the logic required for the flow controller 110a.

FIGS. 6A-B illustrate example memory arrangements according to some embodiments. Generally, these embodiments provide specific arrangements for storage of data items and/or weights to enable reading of those items using a reduced number of accesses then might otherwise be required.

Both arrangements represent data for pixels, such as channel data for the pixels, weights for the pixels, references to weights, or some combination thereof. For example, the intersection of a row and a column would correspond to data for a corresponding pixel and column—e.g., pixel 3 column two is represented by p3c2 with similar representations for p1c1-pncm. FIG. 6A is directed towards an approach to span the data for a given pixel across different memory banks but in corresponding rows. FIG. 6B in contrast is directed towards providing rows of information for different pixels at different memory banks. In some embodiments, the two approaches could be combined to have rows for pixels split across multiple banks where a single row does not span all the banks—e.g., odd numbered rows could be on banks 1 and 3, while even number rows could be on banks 2 and 4. In this way, data for multiple rows can be read into the array input controller 110 during a single memory access.

FIG. 6A illustrates a first memory arrangement according to some embodiments. The first memory arrangement comprises a plurality of memory banks with different channels split across different banks.

For example, bank 1 at 601a includes data for channels 1-m and bank k at 601k includes data for channels c1-cm, where c1=km+1 and cm=km+m where k is the bank number and m is the number of rows per bank. Bank 1 at 601A has data for respective pixels arranged in a plurality of rows where each row corresponds to a different pixel. Bank k at 601k also has that same arrangement of the pixel such that data for each pixel is arranged along the same rows but for different channels. Additional banks from 1-k might be provided to store data for additional channels as necessary. Data for each pixel data might be arranged as rows such that pixels 1-n are maintained in the memory banks. In this way, a row or number of rows can be read to retrieve the data needed to process.

FIG. 6B illustrates a second memory arrangement according to some embodiments. The second memory arrangement comprises a plurality of memory banks with different pixels split across different banks.

For example, bank 1 at 602a includes data for pixels 1-4 whereas bank 2 at 602b comprises data for pixels 5-8. Additional banks could be provided as needed to store additionally rows of data for respective pixels. In this way a read for a single pixel can be encompassed by a read of a single row in a memory bank. Additional memory banks could also be provided to read other rows and retrieve other sets of pixel data.

Figure 7:
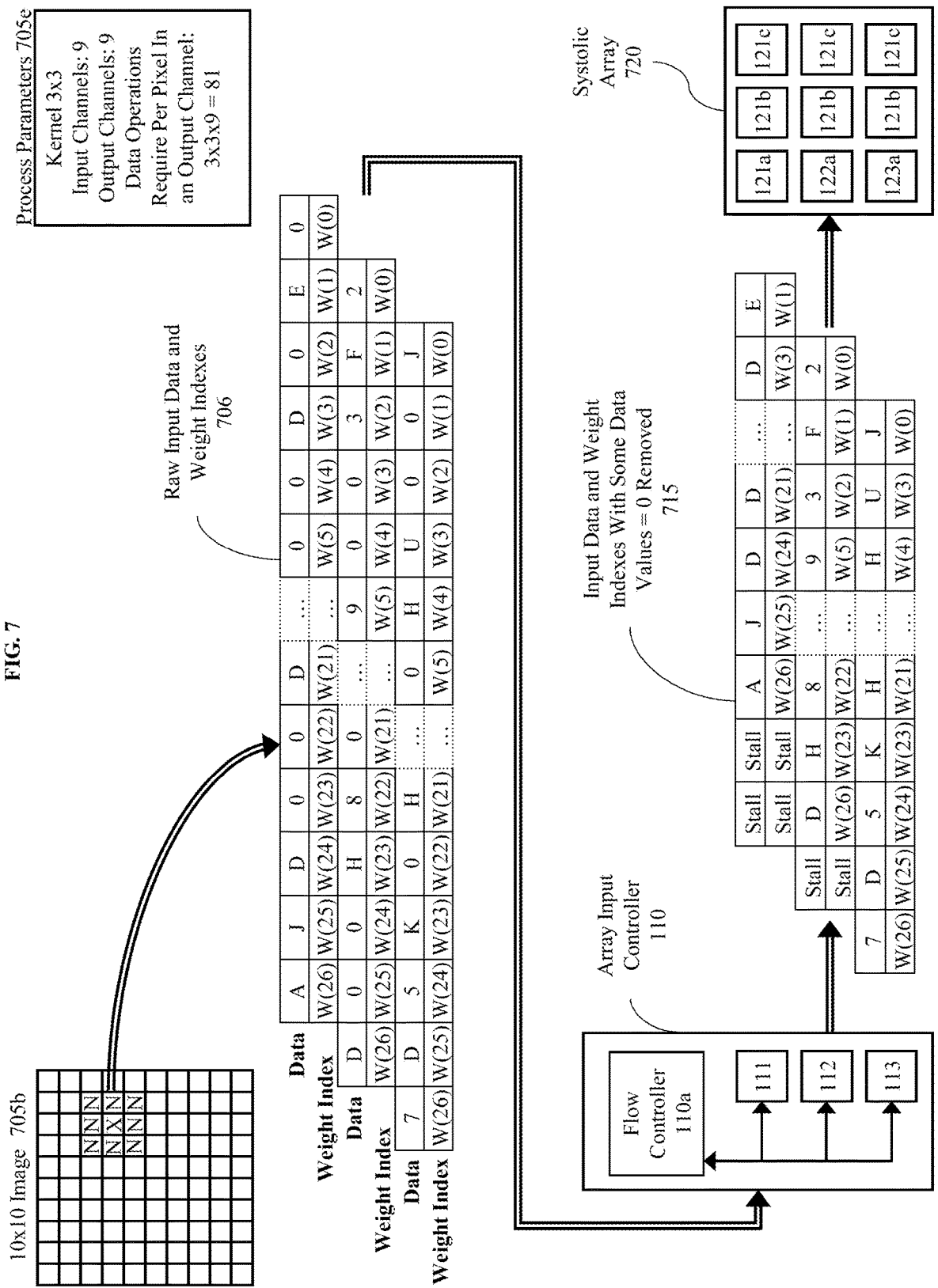
FIG. 7 provide an illustrative example of the machine learning process leveraging input sparsity on a pixel by pixel basis according to some embodiments.

FIG. 7 provide an illustrative example of the machine learning process leveraging input sparsity on a pixel by pixel basis according to some embodiments.

Similar to FIG. 1A an image is provided that has a certain dimension. Here, that image 705b has a size of 10×10. The image and a machine learning processing job is associated with a set of process parameters 705e. Those parameters specify the kernel size (3×3) the number of input channels (9), the number of output channels (9), and the number of data operations required per pixel in an output channel (3×3×9=81).

The raw input data and weight indexes for the pixel identified by X and the data for its neighbors (see pixels marked with "N") as identified based on the kernel size are represented at 706. As illustrated, the first row of raw input data has at least six values equal to zero, the second has at least five values equal to zero, and the third has at least four values equal to zero. Each row has 27 items, though some are not illustrated, each with a data value and a corresponding weight index W(0)-W(26) in each row which may differ from row to row. The raw input data and weight indexes are passed to the array input controller 110.

The array input controller 110 includes at least 3 input elements 111, 112, and 113. Each to the of the input elements 111-113 will remove entries for data items equal to zero or pass only entries for data items that are not equal to zero. The result of this is represented at 715, where the input data and weight indexes are provided such that data values equal to zero are no longer present. If we assume that the portion of the raw data that is not illustrated include no values equal to zero, four cycles can be saved in this example because each row has at least four data values equal to zero. Additionally, to maintain alignment of the data for each pixel, stalls are inserted into the systolic array. However, in other embodiment, an equivalent number of stalls are inserted into systolic array 720 which has three rows and three columns of processing elements and differ from systolic array 120 only in this number of processing elements. As a result, the example illustrated here would save four cycles for this pixel.

System Architecture Overview

Figure 8:
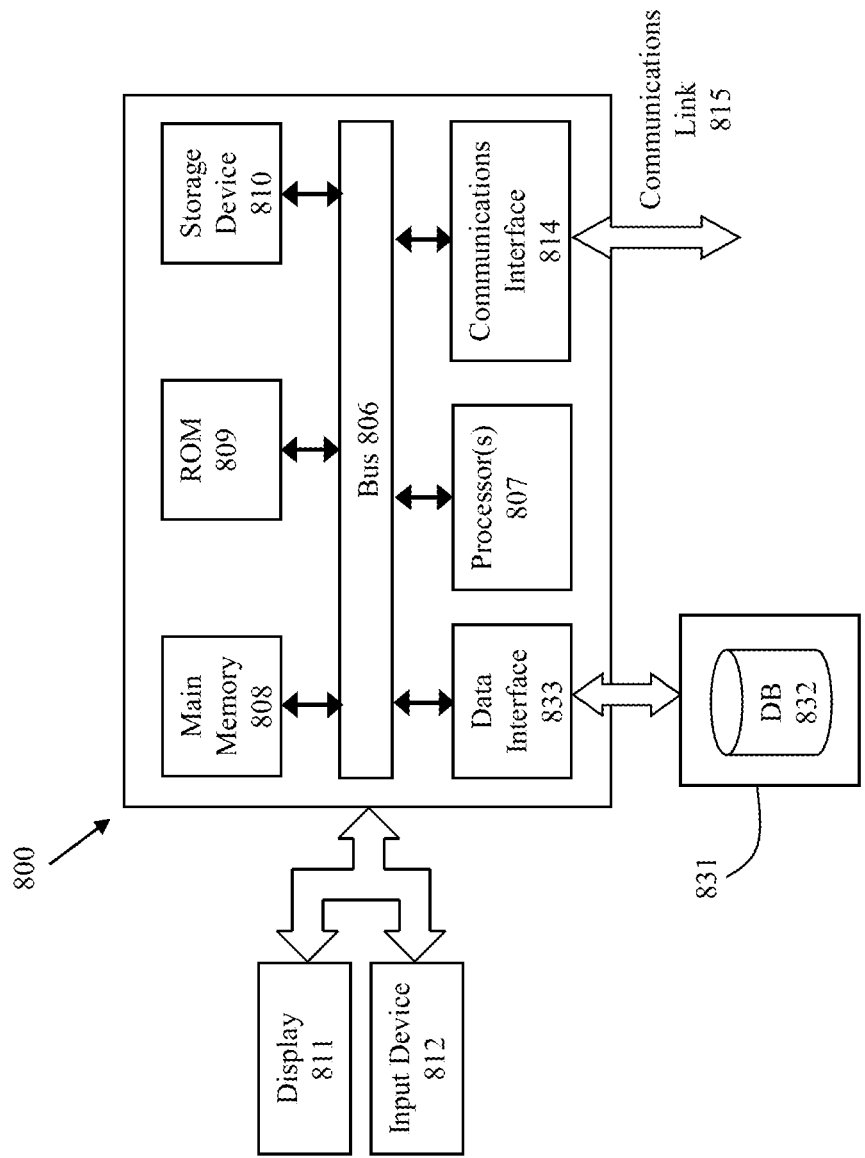
FIG. 8 shows an architecture of an example computing system with which the invention or parts of the invention may be implemented.

FIG. 8 shows an architecture of an example computing system with which the invention or parts of the invention may be implemented.

Computer system 800 includes a bus 806 or other communication mechanism for communicating information, which interconnects subsystems and devices, such as processor 807, system memory 808 (e.g., RAM), static storage device (e.g., ROM 809), storage device 810 (e.g., magnetic or optical disk drives), communication interface 814 (e.g., modem or Ethernet card), display 811 (e.g., CRT or LCD), input device 812 (e.g., keyboard), and cursor control.

According to one embodiment of the invention, computer system 800 performs specific operations by processor 807 executing one or more sequences of one or more instructions contained in system memory 808. Such instructions may be read into system memory 808 from another computer readable/usable medium, such as ROM 809 or storage device 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as storage device 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in storage device 810, or other non-volatile storage for later execution. Computer system 800 may communicate through a data interface 833 to a database 832 on an external storage device 831.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Thus, disclosed here is an method product and apparatus for decreasing the amount of wasted operations executed for machine learning processing by leveraging input sparsity on a pixel by pixel basis. This approach includes a method, product, and apparatus for dynamically removing sparse data on a pixel by pixel basis by selecting non-zero data values for input into a systolic array, wherein sparse data is not selected for input into the systolic array. Because unnecessary processing is avoid the power consumption for the process is decreased and in some embodiments the number of clock cycles needed for execution is reduced.

What is claimed is:

1. A machine learning apparatus, comprising:
a data memory for storing a data matrix;
an array input controller for controlling execution of a machine learning processing job on a pixel by pixel basis; and
a systolic array for executing the machine learning processing job, wherein the array input controller
determines a maximum number data values for input into each row of a plurality of rows of the systolic array based on a count of a number of non-zero data values in data for input into each row and
selects up to the maximum number of non-zero data values for input into each row of the plurality of rows of the systolic array.

2. The machine learning apparatus of claim 1, wherein the array input controller splits a number of non-zero data values across the plurality of rows of the systolic array.

3. The machine learning apparatus of claim 2, wherein data for input into a first row of the plurality of rows comprises a first number of non-zero data values, data for input into a second row of the plurality of rows comprises a second number of non-zero data values, the first number being greater than the second number, and the data for input into the second row is padded with one or more stalls.

4. The machine learning apparatus of claim 3, wherein the one or more stalls comprise a number of stalls equal to the first number minus the second number and at least some sparse data is not selected for input into the systolic array.

5. The machine learning apparatus of claim 3, wherein a stall comprises a no-op instruction, a multiplication by zero, or an operation that does not change a corresponding partial sum.

6. The machine learning apparatus of claim 3, wherein timing for capture of results data from the systolic array is varied by the array input controller based on at least a number of active processing elements in the systolic array.

7. The machine learning apparatus of claim 1, wherein controlling the execution of a machine learning processing job on a pixel by pixel basis comprises preloading, by the array input controller, a plurality of weights into the systolic array prior to processing the non-zero data values.

8. The machine learning apparatus of claim 1, wherein controlling the execution of a machine learning processing job on a pixel by pixel basis by selecting non-zero data values for input into a systolic array further comprises, for a first cycle, inputting a first dynamically selected weight into a first processing element in a first column and a second dynamically selected weight into a second processing element in the first column and at least a first data input into a first row and a second data input into a second row.

9. The machine learning apparatus of claim 1, wherein non-zero data values are processed using a plurality of dynamically selected weights that correspond to the non-zero data values.

10. A method, comprising:
storing a data matrix in a data memory;
controlling execution of a machine learning processing job on a pixel by pixel basis using an array input controller; and
executing the machine learning processing job using a systolic array, wherein the array input controller
determines a maximum number data values for input into each row of a plurality of rows of the systolic array based on a count of a number of non-zero data values in data for input into each row and
selects up to the maximum number of non-zero data values for input into each row of the plurality of rows of the systolic array.

11. The method of claim 10, wherein the array input controller splits a number of non-zero data values across the plurality of rows of the systolic array.

12. The method of claim 11, wherein data for input into a first row of the plurality of rows comprises a first number of non-zero data values, data for input into a second row of the plurality of rows comprises a second number of non-zero data values, the first number being greater than the second number, and the data for input into the second row is padded with one or more stalls.

13. The method of claim 12, wherein the one or more stalls comprise a number of stalls equal to the first number minus the second number and at least some sparse data is not selected for input into the systolic array.

14. The method of claim 12, wherein a stall comprises a no-op instruction, a multiplication by zero, or an operation that does not change a corresponding partial sum.

15. The method of claim 12, wherein timing for capture of results data from the systolic array is varied by the array input controller based on at least a number of active processing elements in the systolic array.

16. The method of claim 10, wherein controlling the execution of a machine learning processing job on a pixel by pixel basis comprises preloading, by the array input controller, a plurality of weights into the systolic array prior to processing the non-zero data values.

17. The method of claim 10, wherein controlling the execution of a machine learning processing job on a pixel by pixel basis by selecting non-zero data values for input into a systolic array further comprises, for a first cycle, inputting a first dynamically selected weight into a first processing element in a first column and a second dynamically selected weight into a second processing element in the first column and at least a first data input into a first row and a second data input into a second row.

18. The method of claim 10, wherein non-zero data values are processed using a plurality of dynamically selected weights that correspond to the non-zero data values.

19. A non-transitory computer readable medium, having stored thereon a set of configuration information for configuring a gate array or generating an application specific integrated circuit, the set of configuration information, when implemented performs a set of acts, the set of acts comprising:
storing a data matrix in a data memory;
controlling execution of a machine learning processing job on a pixel by pixel basis using an array input controller; and executing the machine learning processing job using a systolic array, wherein the array input controller
  determines a maximum number data values for input into each row of a plurality of rows of the systolic array based on a count of a number of non-zero data values in data for input into each row and
  selects up to the maximum number of non-zero data values for input into each row of the plurality of rows of the systolic array.

20. The non-transitory computer readable medium of claim 19, wherein the array input controller splits a number of non-zero data values across the plurality of rows of the systolic array.

21. The non-transitory computer readable medium of claim 20, wherein data for input into a first row of the plurality of rows comprises a first number of non-zero data values, data for input into a second row of the plurality of rows comprises a second number of non-zero data values, the first number being greater than the second number, and the data for input into the second row is padded with one or more stalls.

22. The non-transitory computer readable medium of claim 21, wherein the one or more stalls comprise a number of stalls equal to the first number minus the second number and at least some sparse data is not selected for input into the systolic array.

23. The non-transitory computer readable medium of claim 21, wherein a stall comprises a no-op instruction, a multiplication by zero, or an operation that does not change a corresponding partial sum.

24. The non-transitory computer readable medium of claim 21, wherein timing for capture of results data from the systolic array is varied by the array input controller based on at least a number of active processing elements in the systolic array.

25. The non-transitory computer readable medium of claim 19, wherein controlling the execution of a machine learning processing job on a pixel by pixel basis comprises preloading, by the array input controller, a plurality of weights into the systolic array prior to processing the non-zero data values.

26. The non-transitory computer readable medium of claim 19, wherein controlling the execution of a machine learning processing job on a pixel by pixel basis by selecting non-zero data values for input into a systolic array further comprises, for a first cycle, inputting a first dynamically selected weight into a first processing element in a first column and a second dynamically selected weight into a second processing element in the first column and at least a first data input into a first row and a second data input into a second row.

27. The non-transitory computer readable medium of claim 19, wherein non-zero data values are processed using a plurality of dynamically selected weights that correspond to the non-zero data values.

* * * * *